United States Patent
Khayrallah

(10) Patent No.: US 7,113,745 B2
(45) Date of Patent: Sep. 26, 2006

(54) METHOD TO ACHIEVE DIVERSITY IN A COMMUNICATION NETWORK

(75) Inventor: Ali S. Khayrallah, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 553 days.

(21) Appl. No.: 09/790,416

(22) Filed: Feb. 21, 2001

(65) Prior Publication Data
US 2002/0115409 A1 Aug. 22, 2002

(51) Int. Cl.
H04B 7/00 (2006.01)

(52) U.S. Cl. .......... 455/41.2; 455/11.1; 455/13.1; 455/562.1; 455/69; 455/432.2; 455/101; 455/522; 375/347; 375/142; 375/346; 370/208; 370/335; 370/342

(58) Field of Classification Search .......... 455/41.1, 455/562.1, 63.4, 63.1, 215, 13.1, 13.3, 11.1, 455/522, 110; 370/208, 209, 335; 375/346, 375/347
See application file for complete search history.

(56) References Cited

U.S. PATENT DOCUMENTS

| | | | |
|---|---|---|---|
| 6,049,315 A * | 4/2000 | Meyer | 343/895 |
| 6,097,970 A * | 8/2000 | Angus et al. | 455/562.1 |
| 6,108,364 A | 8/2000 | Weaver, Jr. et al. | |
| 6,130,881 A | 10/2000 | Stiller et al. | |
| 6,185,258 B1 * | 2/2001 | Alamouti et al. | 375/260 |
| 6,205,127 B1 * | 3/2001 | Ramesh | 370/329 |
| 6,298,092 B1 * | 10/2001 | Heath et al. | 375/267 |
| 6,356,605 B1 * | 3/2002 | Hosur et al. | 375/347 |
| 6,377,612 B1 * | 4/2002 | Baker | 375/141 |
| 6,411,824 B1 * | 6/2002 | Eidson | 455/561 |
| 6,452,916 B1 * | 9/2002 | Hochwald et al. | 370/342 |
| 6,459,881 B1 * | 10/2002 | Hoder et al. | 455/11.1 |
| 6,501,955 B1 * | 12/2002 | Durrant et al. | 455/456.1 |
| 6,542,556 B1 * | 4/2003 | Kuchi et al. | 375/299 |
| 6,560,443 B1 * | 5/2003 | Vaisanen et al. | 455/73 |
| 6,574,266 B1 * | 6/2003 | Haartsen | 375/133 |
| 6,697,375 B1 * | 2/2004 | Meng | 370/465 |
| 6,975,613 B1 * | 12/2005 | Johansson | 370/338 |

FOREIGN PATENT DOCUMENTS

| | | |
|---|---|---|
| EP | 0837568 A2 | 4/1998 |
| WO | WO96/09697 | 3/1996 |
| WO | WO97/11537 | 3/1997 |
| WO | WO00/51264 | 8/2000 |
| WO | WO 02/15613 A1 | 2/2002 |

* cited by examiner

Primary Examiner—Marceau Milord
(74) Attorney, Agent, or Firm—Coats & Bennett, P.L.L.C.

(57) ABSTRACT

A method of wirelessly communicating between units comprises using at least two repeaters between a transmit unit and a receive unit. The repeaters enable a diversity scheme to be emulated.

16 Claims, 4 Drawing Sheets

METHOD TO ACHIEVE DIVERSITY IN A COMMUNICATION NETWORK

BACKGROUND OF THE INVENTION

The present invention is related to a method of creating spatial diversity in wireless communication networks.

Wireless communication systems have exploded in popularity in recent years. Cellular phones, pagers, and more recently Bluetooth devices all take advantage of these wireless communication systems. A common obstacle to wireless communications is a phenomenon known as fading, where messages transmitted between two units in the system are lost or garbled.

One technique to combat fading is using diversity schemes such as a spatial transmit diversity scheme. Transmit diversity schemes send at least two signals from distinct antennas or antenna elements. The signals contain parts or all of the same message. The goal of transmit diversity it to alleviate the effects of fading. The signals are transmitted in such a way that they do not cancel each other at the receiver. The receiver can process the signals to exploit diversity and improve performance. Transmit diversity can be viewed as a dual of traditional receive diversity, where signals from multiple receive antennas are processed by the receiver. Transmit and receive diversity can also be used together to obtain further improvements. Transmit diversity methods include delay diversity, the Alamouti code, the Lindskog-Paulraj technique, space-time codes, BLAST, and other similar methods. Some transmit diversity schemes require multiple transmit antennas, which may be difficult to implement in small, inexpensive wireless devices. For example, Bluetooth devices typically have a single transmit antenna operative in the Bluetooth frequency band.

BRIEF SUMMARY OF THE INVENTION

The present invention may be used in ad-hoc networks such as are created in Bluetooth systems. In particular, a transmit unit, using a single transmit antenna may send a message to at least two intermediate units that act as repeaters to send the message to a receive unit. By routing the message through the two repeaters, spatial transmit diversity is created.

To route the message through the two repeaters, the message may be encoded into two distinct signals, each of which is sent to a different repeater. The encoding process may use any number of coding schemes such as an Alamouti code, a Linskogg-Paulraj code, or the like.

Further, the present method of using repeaters may be used to fine tune power control feedback loops. The receiver may control the repeaters and the repeaters may control the originating station such that power is conserved.

DETAILED DESCRIPTION OF THE INVENTION

The present invention relates to diversify techniques for wireless communication network. In particular, the present invention provides a technique of creating special diversity between a transmit unit using a single antenna and a receive unit using a single antenna. Other forms of diversity may also be created. Spatial diversity, as used herein, is defined to be those situations where diversity is achieved by antenna separation. This is conventionally achieved by using a plurality of antennas at either the transmitter or receiver. According to the present invention, partial diversity is achieved by using a plurality of repeaters, interposed between a transmitter and a receiver. This invention is primarily directed at ad hoc networks, such as a Bluetooth network, but is also applicable to WCDMA-TDD systems and other types of networks.

Figure 1:
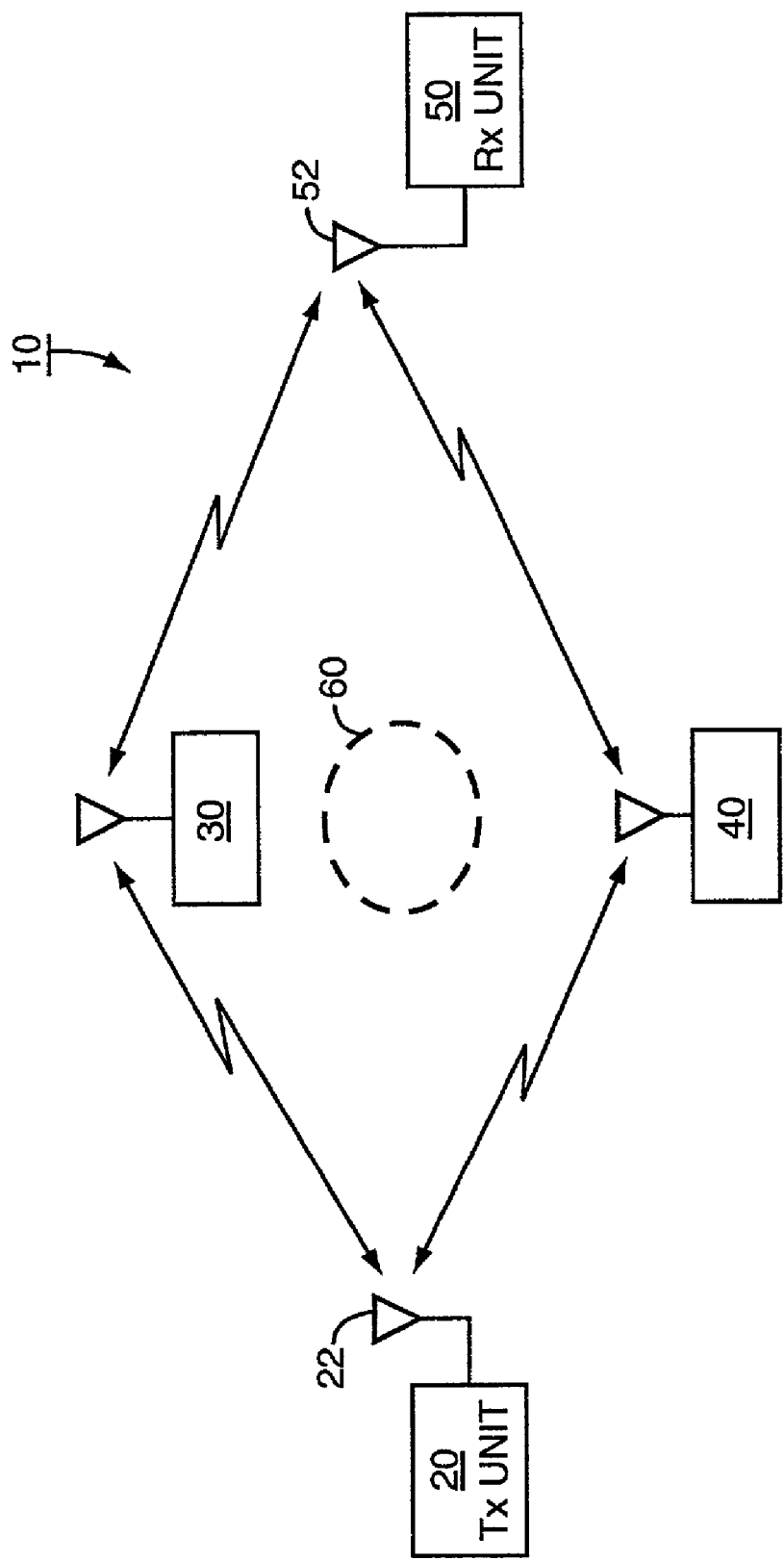
FIG. 1 is a block diagram of a wireless communication system according to one embodiment of the present invention.

FIG. 1 illustrates the basic concept of the present invention. A wireless communication network 10 comprises a transmit unit 20, a first intermediate unit 30, a second intermediate unit 40, and a receive unit 50. An obstacle 60 may be present within the network 10. Obstacles include geographic or man-made features that inhibit wireless communication as well as environmental factors that inhibit wireless communication. While obstacles 60 may encourage the use of the present invention, they need not be present to justify using the present methodology. Transmit unit 20 uses a single transmit antenna 22 within an operative frequency band. Likewise, receive unit 50 uses a single receive antenna 52 within the operative frequency band.

In one embodiment, the network 10 is an ad hoc network, such as envisioned by the Bluetooth standard. The Bluetooth standard enables seamless communication of data and voice over short-range wireless links between both mobile devices and fixed devices. The Bluetooth standard permits ad hoc networking of devices equipped with a Bluetooth interface. Different Bluetooth devices can automatically connect and link up with one another when they come into range to form an ad hoc network, generally referred to as a piconet. The Bluetooth standard specifies how mobile devices, such as phones, personal digital assistants (PDAs), and wireless information devices (WIDS), can interconnect with one another and with stationary devices, such as desktop computers, printers, scanners, and stationary phones.

Bluetooth devices operate in the Industrial-Scientific-Medical (ISM) frequency band at approximately 2.45 GHz. The ISM band is an unlicensed frequency band. The Bluetooth standard employs spread spectrum techniques that provide a high degree of interference immunity and multiple access. In particular, the Bluetooth standard employs a spread spectrum technique called frequency hopping to spread a narrowband signal over a wide spectrum of frequencies. This technique spreads a narrowband signal by "hopping" from one frequency to another in a defined sequence in accordance with a pseudo-random code and at a defined hop rate.

Frequency hop systems divide the frequency band into a plurality of hop carriers or frequencies. Each hop channel comprises a defined sequence of frequency hops. The Bluetooth standard defines seventy-nine hop frequencies with one MHz spacing. A hop channel comprises a particular sequence of frequency hops. A hop channel is divided into 625 microsecond intervals—called slots—each corresponding to a different hop frequency. Thus, the Bluetooth device hops from one hop frequency to another, remaining on each hop frequency for a period of 625 microseconds, giving a nominal hop rate of 1,600 hops per second. One packet can be transmitted per slot or hop. Slots within a hop channel are alternately used for transmitting and receiving, which results in a time division duplex (TDD) scheme.

Each hop channel is determined by the hop sequence (the order in which the hop frequencies are visited) and by the phase of the hop sequence. Two or more units sharing the same hop channel form a piconet, where one unit acts as a master—controlling traffic on the piconet—and the remaining units act as slaves. Under the Bluetooth standard, the hop sequence is determined by the master unit's system clock. The slaves use the master identity to select the same hop sequence and add time offsets to their respective native clocks to synchronize to the master unit.

The last bit of the Bluetooth puzzle that may be helpful in understanding the basics of the standard is how the piconets are formed. Every Bluetooth device is identified by a unique address called the Bluetooth device address. A first device obtains this address from a second device through a procedure called an "inquiry." When the first device invokes the inquiry procedure, all listening devices in range of the first device will respond to this inquiry by returning a response that includes inter alia the Bluetooth device address of the responding device. The standard has provisions for preventing the responding devices from responding all at the same time. Thus, after the inquiry procedure, the first device has the Bluetooth device address for all Bluetooth devices within range of the first device. The first device may now establish a connection to form a piconet. The procedure for establishing this connection is called "paging." A page is always directed towards one device, typically, one of the devices for which a response to an inquiry was received. However, the paging device may already have the Bluetooth device address of the paged device without the need for sending an Inquiry message to obtain the address. When the first device initiates a page to the second device, the second device answers the page and synchronizes itself to the first device's hop channel, while also offsetting its internal clock. Thus, for that piconet, the paged device becomes a slave unit with respect to the paging device. There may be an optional authentication step in this process if needed or desired.

In network 10, any of the units 20, 30, 40, or 50 may be the master unit. However, for the purpose of further description, it is assumed that the transmit unit 20 is the master and connects to the receive unit 50. While establishing that connection, the transmit unit 20 and the receive unit 50 may negotiate a protocol to specify how further communications between the two will be conducted. This negotiation may cover whether diversity is to be employed and who will be the master. From this initial negotiation, the two units 20, 50 may recruit the intermediate units 30, 40 to serve as repeaters as described below. This negotiation step may involve an extension or modification of the existing Bluetooth standard to implement the present invention. If transmit unit 20 and receive unit 50 elect to implement diversity in further communications, intermediate units 30 and 40 are notified, typically by the transmit unit 20 to serve as repeaters. Intermediate units 30 and 40 relay messages from transmit unit 20 to receive unit 50, as hereinafter described, in a fashion that creates a spatial diversity despite the fact that the transmit unit 20 and the receive unit 50 only use a single antenna 22, 52 respectively, at the operative frequency band to transmit and receive the message.

In one exemplary embodiment of the invention, transmit unit 20 processes a message to be transmitted to produce two distinct signals $s_1$ and $s_2$. A message, as used herein, comprises the information that the transmit unit 20 wishes to convey to the receive unit 50. It may comprise voice, data, or some other information as needed or desired. Transmit unit 20 may use an Alamouti coder to process the message into the two distinct signals. Other codes are also contemplated, such as the Linskogg-Paulraj code. Transmit unit 20 sends signal $s_1$ to a first intermediate unit 30 and signal $s_2$ to a second intermediate unit 40. The two signals may be transmitted simultaneously on different frequencies, or sequentially on the same frequency. In a CDMA system, such as WCDMA-TDD, the two signals can be transmitted simultaneously on different spreading codes, which provide orthogonality or quasi-orthogonality, enabling the receiver to distinguish between them. More generally, each of the two signals can be transmitted on a number of spreading codes. In either case, intermediate units 30, 40 retransmit their respective received signals $s_1$ and $s_2$ on the same frequency and at the same time to the receive unit 50. The signal r received at receive unit 50 can thus be modeled as:

$$r = a_1 s_1 + a_2 s_2 + n \qquad \text{Eq. (1)}$$

where $a_1$ and $a_2$ represent the cumulative fading channels between transmit unit 20 and receive unit 50 through intermediate units 30, 40, respectively, and n represents the cumulative noise and interference from transmit unit 20 to receive unit 50. Receive unit 50 processes the received signal r to recover the original message. Such processing is well known in the art. To summarize briefly, receive unit 50 generates channel estimates of $a_1$ and $a_2$ and then uses these channel estimates to generate estimates of signals $s_1$ and $s_2$. The estimates of $s_1$ and $s_2$ are then provided to a decoder, which process the estimates of $s_1$ and $s_2$ to generate an estimate of the original message. For example, if Alamouti encoding is used, receive unit 50 would include an Alamouti decoder to combine or decode signals $s_1$ and $s_2$. Of course, other diversity combining techniques could be employed by receive unit 50.

Equation (1) assumes flat fading channels with a single tap, but the extension to multi-tap channels is well within the skill of those proficient in the art. If intermediate units 30 and 40 are separated enough in space, then the cumulative fades are uncorrelated. In this case, equation (1) corresponds with the received signal in a system with two antenna transmit diversity. To this extent, the network 10 has created a spatial transmit diversity scheme. The present invention may be particularly useful in a Bluetooth network, spatial diversity is a helpful feature, as most units 20, 30, 40, and 50, will only use a single antenna at the ISM frequencies.

This concept is easily extended. For example, intermediate units 30, 40 may retransmit their received signals to receive unit 50 twice. In one variation, the retransmitted signals $s_1$, $s_2$ may be sent at a first time on a first common frequency and at a second time on a different common frequency. In a second variation, the retransmitted signals $s_1$, $s_2$ may be transmitted simultaneously at a first time, and again at a second time. The signals $r_1$ and $r_2$ received at receive unit 50 may be expressed as:

$$r_1 = a_1 s_1 + a_2 s_2 + n_1 \qquad \text{Eq. (2)}$$

and $$r_2 = a_1' s_1 + a_2' s_2 + n_2 \qquad \text{Eq. (3)}$$

Equations (2) and (3) correspond with the received signals for a system with two transmit antennas and two receive antennas. Receive unit 50 processes received signals $r_1$ and $r_2$ as previously described to recover the original message. Thus, not only is transmit diversity created, but also receive diversity is created.

In another variation of the invention, intermediate units 30, 40 may retransmit their respective received signals $s_1$, $s_2$ on different frequencies or at different times to the receive unit 50. The signals $r_1$ and $r_2$ received at receive unit 50 may be expressed as:

$$r_1 = a_1 s_1 + n_1 \qquad \text{Eq. (4)}$$

and $$r_2 = a_2 s_2 + n_2 \qquad \text{Eq. (5)}$$

This variation may simplify processing of the message at the receive unit 50 as there is no crosstalk between the signals $s_1$ and $s_2$ that needs to be separated. It should be noted that even in networks 10 that require intermediate units 30, 40 to retransmit their respective received signals $s_1$, $s_2$ on adjacent frequencies and/or times, spatial separation of intermediate units 30, 40 still provides some form of diversity.

In all the variations, it is expected that the transmit unit 20 instructs the intermediate units 30, 40 on when and how to retransmit the signals, $s_1$, $s_2$ but it is possible, especially when the receive unit 50 is the master unit, that the receive unit 50 is providing these instructions.

Units 20, 30, 40, and 50 may further include power control feedback loops therebetween. In many systems there is a mechanism for fast feedback, allowing a transmitting unit (20, 30, or 40) to receive information from the receiving unit (30, 40, or 50) on a reverse channel regarding the quality of the received signal. This signal quality is reflected in large part by estimates of $a_1$ and $a_2$ and the noise and interference level, where $a_1$ and $a_2$ represent the fading of the channels as previously defined. The feedback is useful to the transmitting unit 20, which can adjust its transmit power accordingly, using one of several known strategies.

Figure 2:
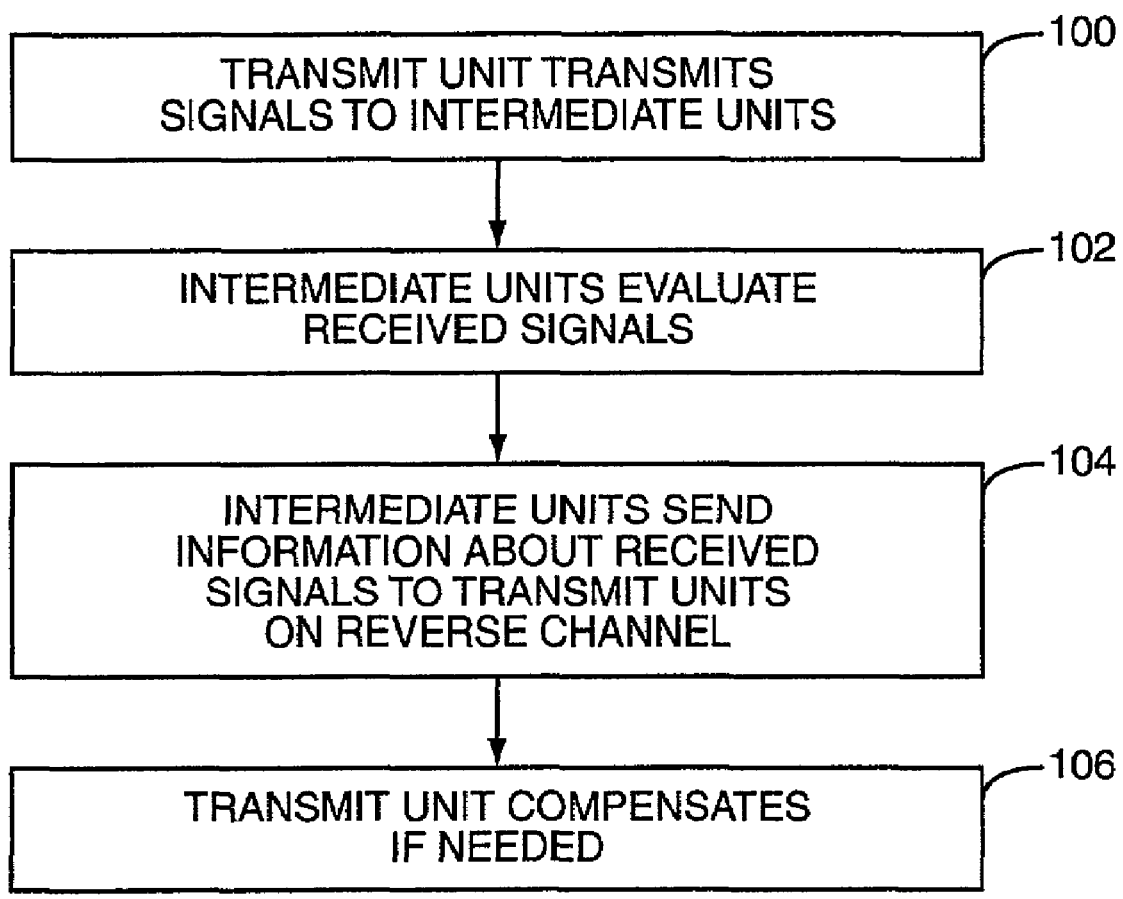
FIG. 2 is a flow diagram illustrating one embodiment of a power control method associated with the present invention.
Figure 3:
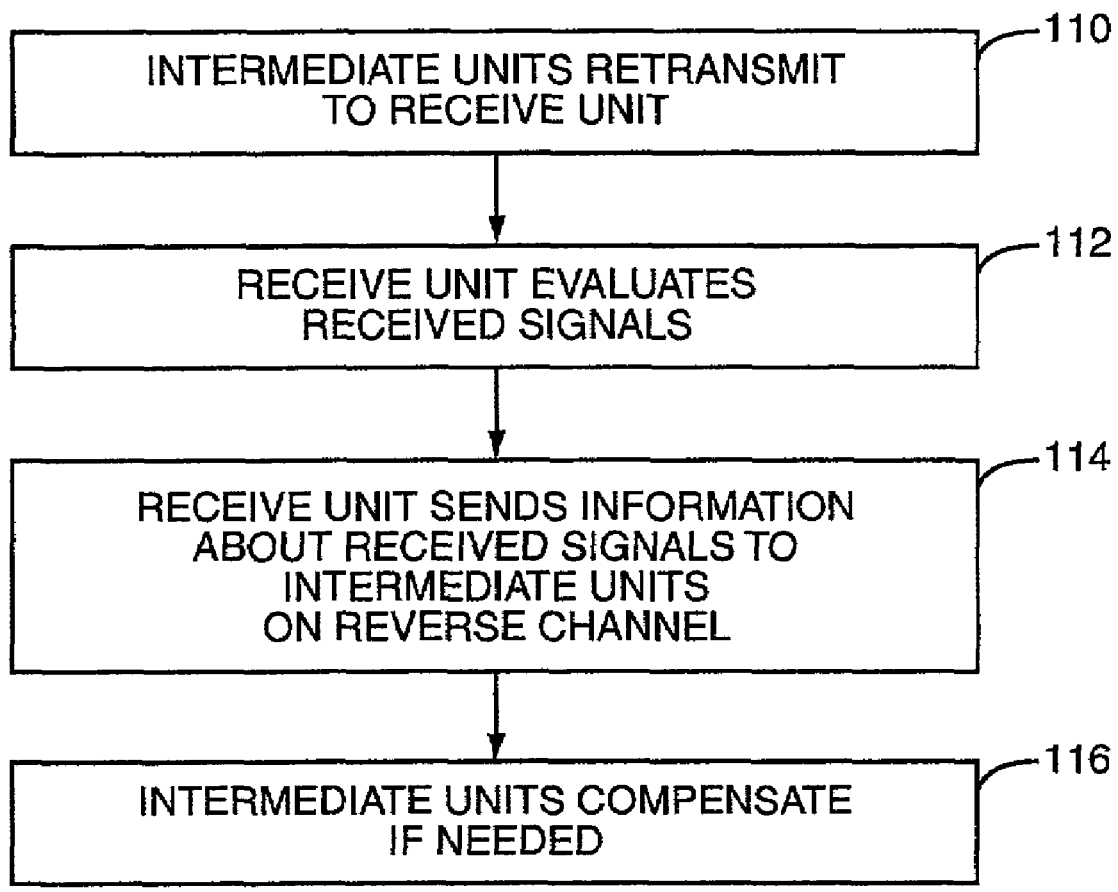
FIG. 3 is a flow diagram illustrating a second embodiment of a power control method associated with the present invention.

Exemplary flow charts illustrating this power control method are presented in FIGS. 2 and 3. In FIG. 2, the transmit unit 20 transmits signals $s_1$ and $s_2$ to the intermediate units 30, 40 (block 100). Intermediate units 30, 40 evaluate the respective received signals $s_1$ and $s_2$ (block 102). This evaluation may include an estimation of fading on the channels that exist between the transmit unit 20 and the intermediate units 30, 40. Intermediate units 30, 40 may also make an estimate of the fading for the complete channels $a_1$ and $a_2$ based on information received from receive unit 50 on the reverse channels. Intermediate units 30, 40 may send information, possibly including channel estimates, as well as other well known parameters, to the transmit unit 20 on an appropriate reverse channel (block 104). Transmit unit 20 compensates for fading in the propagation channel if needed (block 106). Compensation may be according to any known scheme, such as boosting transmitted power to equalize received power or reducing power to faded channels and boosting power to unfaded channels. Other techniques may also be used.

A similar feedback loop exists between the intermediate units 30, 40 and the receive unit 50. This is illustrated in FIG. 3. Intermediate units 30, 40 transmit their respective signals $s_1$ and $s_2$ to the receive unit 50 (block 110). Receive unit 50 evaluates the received signals (block 112). Again this evaluation may include estimating fading on the channels. Receive unit 50 then sends information about the received signals to the intermediate units 30, 40 on an appropriate reverse channel (block 114). Intermediate channels 30, 40 may compensate for fading if needed (block 116). This two-stage power control ability enables the network 10 to do a finer form of power control than contemplated in other systems.

As another variation on the present invention, it is possible that the intermediate units 30, 40 are the units that separate a message into $s_1$ and $s_2$. This would require the space-time encoder to be present at the intermediate units 30, 40, but such is within the scope of the present invention.

Note that the present invention may function with more than two repeaters in a single stage or multiple stages of repeaters. This allows the network 10 to extend the range of the connection or to circumvent obstacles 60 as needed or desired. Other reasons for implementing the present invention in a network 10 are also contemplated.

Further note that the present invention is not limited to ad hoc networks 10, but also may be used in networks with fixed elements, for example, fixed intermediate units 30, 40. In essence, this method will work in almost any TDD system.

Figure 4:
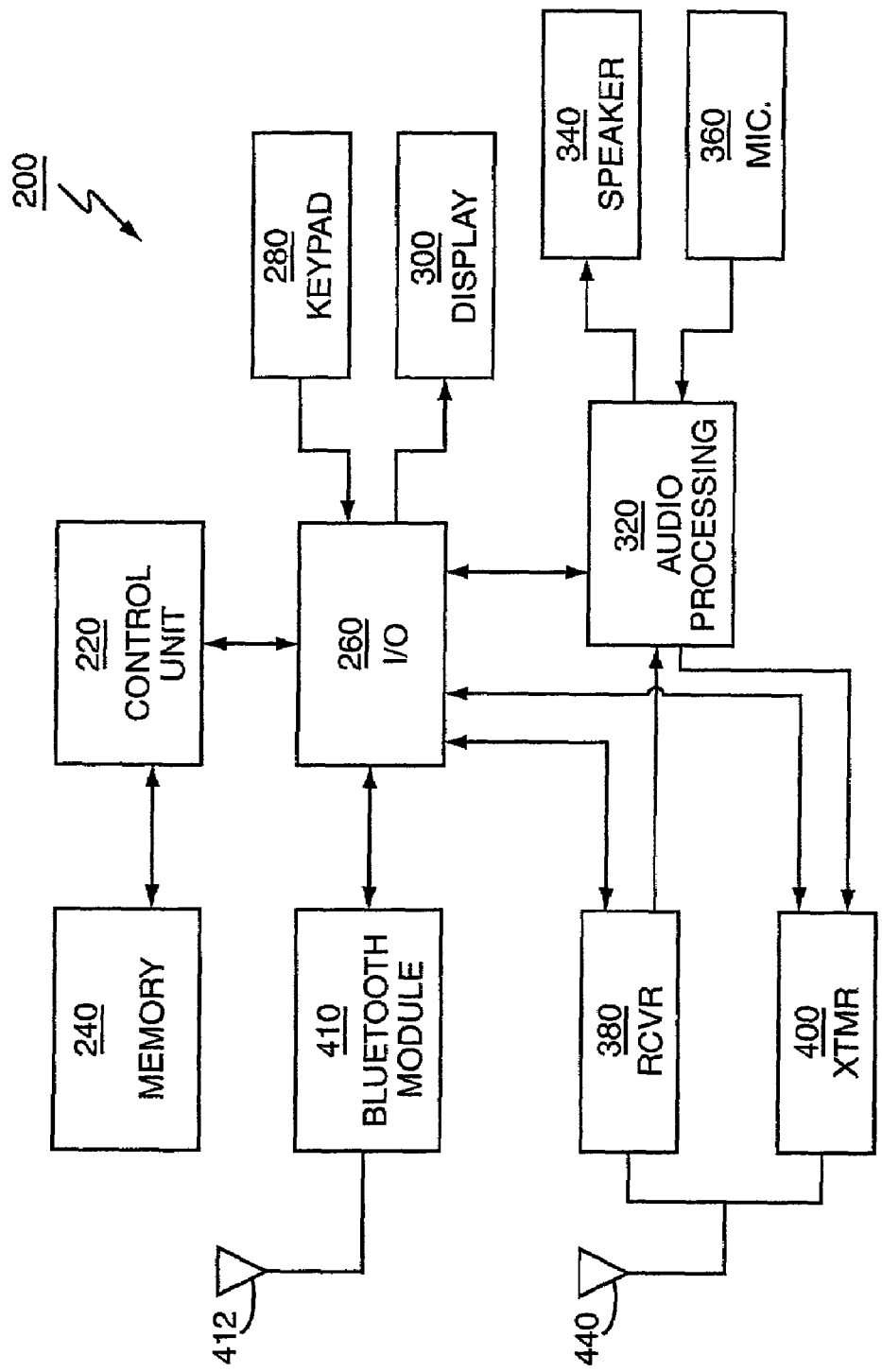
FIG. 4 is a functional block diagram of a mobile terminal such as may be used in conjunction with the present invention.

The present invention, as previously discussed, is particularly well suited for use in Bluetooth networks. While Bluetooth networks may include many different types of devices, a typical device for a Bluetooth network is a mobile terminal. An exemplary mobile terminal 200 is shown in FIG. 4. Mobile terminal 200 comprises a main control unit 220 for controlling the operation of the mobile terminal 200 and memory 240 for storing control programs and data used by the mobile terminal 200 during operation. Memory 240 may be contained in a removable smart card if desired. Input/output circuits 260 interface the control unit 220 with a keypad 280, display 300, audio processing circuits 320, receiver 380, and transmitter 400. The keypad 280 allows the operator to dial numbers, enter commands, and select options. The display 300 allows the operator to see dialed digits, stored information, and call status information. The audio processing circuits 320 provide basic analog audio outputs to a speaker 340 and accept analog audio inputs from a microphone 360. The receiver 380 and transmitter 400 receive and transmit signals using shared antenna 440. The mobile terminal 200 further includes a Bluetooth module 410 operating as previously described and having a single antenna 412 operating in the ISM band.

It should be noted that, as used herein, the term "mobile terminal" 200 may include a cellular radiotelephone with or without a multi-line display; a Personal Communications System (PCS) terminal that may combine a cellular radiotelephone with data processing, facsimile and data communications capabilities; a Personal Digital Assistant (PDA) may include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals 200 may also be referred to as "pervasive computing" devices.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of implementing communication diversity in an ad hoc communication network comprising:
   determining between first and second member transceivers in the ad hoc network that communication diversity is desired;
   negotiating by one or both the first and second member transceivers with one or more additional member transceivers in the ad hoc network to act as diversity repeaters for communications between the first and second member transceivers; and
   communicating between the first and second member transceivers via the one or more diversity repeaters by configuring the one or more diversity repeaters to employ one or both time diversity and frequency diversity for transmissions relayed between the first and second member transceivers.

2. The method of claim 1, wherein the ad hoc communication network comprises a short range wireless communication network.

3. The method of claim 2, wherein the short range wireless communication network comprises a wireless Local Area Network.

4. The method of claim 2, wherein the short range wireless communication network comprises a Bluetooth network.

5. The method of claim 1, further comprising, generating at the first member transceiver two distinct signals corresponding to a message to be conveyed from the first member transceiver to the second member transceiver, and transmitting a first one of the two distinct signals to a first diversity repeater for relay to the second member transceiver, and transmitting a second one of the two distinct signals to a second diversity repeater for relay to the second member transceiver.

6. The method of claim 5, wherein generating at the first member transceiver two distinct signals corresponding to a message to be conveyed from the first member transceiver to the second member transceiver comprises generating the two distinct signals using one of an Alamouti coder, a code-division multiplex coder, or a Linskogg-Paulraj coder.

7. The method of claim 5, wherein generating at the first member transceiver two distinct signals corresponding to a message to be conveyed from the first member transceiver to the second member transceiver comprises generating the two distinct signals to reduce interference by one with the other.

8. The method of claim 1, further comprising closing one or more transmit power control feedback loops between the first and second member transceivers through the one or more diversity repeaters.

9. The method of claim 1, further comprising extending a communicative range between the first and second member transceivers based on recruiting additional member transceivers as diversity repeaters as needed to relay signals between the first and second member transceivers.

10. A mobile terminal configured for operation in an ad hoc network, said mobile terminal comprising:
   a transceiver for communicating with one or more other member terminals in the ad hoc network; and
   processing logic configured to negotiate one or more additional member terminals in the ad hoc network to act as diversity repeaters for communications between the mobile terminal and a particular one of the other member terminals, and further configured to communicate with that particular mobile terminal via the one or more diversity repeaters;
   wherein the processing logic is configured to generate two distinct signals corresponding to a message to be conveyed to the particular member terminal, and to transmit a first one of the two distinct signals to a first diversity repeater for relay to the particular member terminal, and transmit a second one of the two distinct signals to a second diversity repeater for relay to the particular member terminal.

11. The mobile terminal of claim 10, wherein the transceiver comprises a short-range wireless transceiver.

12. The mobile terminal of claim 10, wherein the transceiver comprises a Bluetooth transceiver.

13. The mobile terminal of claim 10, wherein the processing logic is configured to generate the two distinct signals using one of an Alamouti coder, a code-division multiplex coder, or a Linskogg-Paulraj coder.

14. The mobile terminal of claim 13, wherein the processing logic is configured to generate the two distinct signals to reduce interference by one with the other.

15. A method of communicating between first and second member terminals in an ad hoc network, the method comprising:
   recruiting by one or both the first and second member terminals one or more additional member terminals to act as diversity repeaters by recruiting one or more additional member terminals to extend a communication range between the first and second member terminals; and
   communicating between the first and second member terminals based on relaying signals via the diversity repeaters.

16. A method of communicating between first and second member terminals in an ad hoc network, the method comprising:
   recruiting by one or both the first and second member terminals one or more additional member terminals to act as diversity repeaters by notifying at least one additional member terminal, and negotiating with that at least one notified terminal to act as a diversity repeater for communications between the first and second member terminals; and
   communicating between the first and second member terminals based on relaying signals via the diversity repeaters.

* * * * *